US012691016B1

(12) United States Patent
Flannery et al.

(10) Patent No.: US 12,691,016 B1
(45) Date of Patent: *Jul. 28, 2026

(54) BED RAIL THAT TUCKS UNDER MATTRESS

(71) Applicant: Regalo International, LLC, Longboat Key, FL (US)

(72) Inventors: Mark A. Flannery, Longboat Key, FL (US); Porter R. Million, Minneapolis, MN (US)

(73) Assignee: Regalo International, LLC, Longboat Key, FL (US)

(*) Notice: Subject to any disclaimer, the term of this patent is extended or adjusted under 35 U.S.C. 154(b) by 792 days.

This patent is subject to a terminal disclaimer.

(21) Appl. No.: 17/958,423

(22) Filed: Oct. 2, 2022

Related U.S. Application Data

(63) Continuation of application No. 16/779,661, filed on Feb. 2, 2020, now Pat. No. 11,458,053, which is a continuation of application No. 15/203,729, filed on Jul. 6, 2016, now Pat. No. 10,548,408, which is a continuation of application No. 13/928,291, filed on Jun. 26, 2013, now Pat. No. 9,387,141.

(60) Provisional application No. 61/666,856, filed on Jun. 30, 2012.

(51) Int. Cl.

| | |
|---|---|
| ***A61G 7/05*** | (2006.01) |
| ***A47C 21/08*** | (2006.01) |
| ***A47D 7/02*** | (2006.01) |

(52) U.S. Cl.

CPC ............ *A61G 7/0507* (2013.01); *A47C 21/08* (2013.01); *A47D 7/02* (2013.01); *A61G 7/0519* (2016.11)

(58) Field of Classification Search

CPC .. A61G 7/0507; A61G 7/0508; A61G 7/0509; A61G 7/0519; A47D 7/02; A47C 21/08

USPC .............................................................. 5/426

See application file for complete search history.

(56) References Cited

U.S. PATENT DOCUMENTS

| | | |
|---|---|---|
| 2,136,088 A | 11/1938 | Stevens, Sr. |
| 2,750,605 A | 6/1956 | Blevins |
| 2,751,608 A | 6/1956 | Lucas |
| 2,763,014 A | 9/1956 | Luger |
| 3,048,857 A | 8/1962 | Hutt |
| 3,290,701 A | 12/1966 | Luff |
| 4,724,559 A | 2/1988 | Bly |

(Continued)

FOREIGN PATENT DOCUMENTS

| | | |
|---|---|---|
| GB | 2225716 A | 6/1990 |
| GB | 2342852 A | 4/2000 |
| GB | 2530512 A | 3/2016 |

OTHER PUBLICATIONS

Summer Infant, Inc., Out of Sight Extra Wide Bedrail, Instruction Manual, copyright 2010, pp. 1-24, Summer Infant, Inc., Woonsocket, Rhode Island, USA.

*Primary Examiner* — David R Hare

(57) ABSTRACT

A bed rail for engagement between a mattress and a box spring and having a base support and a guard frame, with guard frame having a pivot that pivots and slides in the base support. The base support includes a first seat that seats the pivot and a second seat that seats a biased piece sliding axially on a first support member of the guard frame. The first support member extends from a plastic piece that forms a junction from which a second support member and the pivot extend and that nestles up to the second seat.

2 Claims, 6 Drawing Sheets

(56) References Cited

U.S. PATENT DOCUMENTS

| | | | | |
|---|---|---|---|---|
| 4,833,743 | A | 5/1989 | Howell | |
| 5,577,277 | A | 11/1996 | Sundberg | |
| 5,596,776 | A | 1/1997 | Huang | |
| 5,640,726 | A | 6/1997 | Fichner-Rathus | |
| 5,671,490 | A | 9/1997 | Wu | |
| 5,761,756 | A | 6/1998 | Nowak | |
| 6,374,437 | B1 | 4/2002 | Voelker | |
| 6,795,988 | B2 | 9/2004 | Hueppe | |
| 6,959,463 | B2 | 11/2005 | Macari | |
| 6,990,697 | B1 * | 1/2006 | Clute | A61G 7/0518 5/426 |
| 7,237,285 | B2 | 7/2007 | Brewin | |
| 7,908,689 | B2 | 3/2011 | Flannery | |
| 8,091,163 | B2 | 1/2012 | Flannery | |
| 8,307,477 | B2 * | 11/2012 | Boucquey | A47C 21/08 5/426 |
| 8,365,324 | B2 | 2/2013 | Flannery | |
| 8,458,831 | B2 | 6/2013 | Flannery et al. | |
| 9,125,498 | B2 | 9/2015 | Flannery | |
| 9,387,141 | B1 * | 7/2016 | Flannery | A61G 7/0507 |
| 9,687,081 | B1 | 6/2017 | Flannery | |
| 10,548,408 | B1 * | 2/2020 | Flannery | A61G 7/0507 |
| 10,617,222 | B1 | 4/2020 | Flannery | |
| 10,945,532 | B1 | 3/2021 | Flannery | |
| 11,278,126 | B1 * | 3/2022 | Flannery | A47C 21/08 |
| 11,458,053 | B1 * | 10/2022 | Flannery | A47D 15/008 |
| 2003/0229941 | A1 | 12/2003 | Hueppe | |
| 2004/0168251 | A1 * | 9/2004 | Waldman | A47C 21/08 5/426 |
| 2004/0187209 | A1 * | 9/2004 | Flannery | A61G 7/0507 5/426 |
| 2004/0250347 | A1 * | 12/2004 | Brewin | A61G 7/051 5/426 |
| 2006/0026759 | A1 * | 2/2006 | Flannery | A61G 7/0518 5/426 |
| 2006/0174408 | A1 * | 8/2006 | Flannery | A61G 7/0507 5/426 |
| 2011/0167560 | A1 | 7/2011 | Flannery | |
| 2012/0084915 | A1 | 4/2012 | Flannery et al. | |
| 2012/0102642 | A1 | 5/2012 | Flannery | |
| 2017/0055717 | A1 | 3/2017 | Guthrie | |

* cited by examiner

BED RAIL THAT TUCKS UNDER MATTRESS

This application is a continuation, and claims the benefit under 35 U.S.C. § 120, of U.S. Nonprovisional patent application Ser. No. 16/779,661 filed Feb. 2, 2020, which application is a continuation, and claims the benefit under 35 U.S.C. § 120, of U.S. Nonprovisional patent application Ser. No. 15/203,729 filed Jul. 6, 2016, which is a continuation, and claims the benefit under 35 U.S.C. § 120, of U.S. Nonprovisional patent application Ser. No. 13/928,291 filed Jun. 26, 2013, which claims the benefit under 35 U.S.C. 119(e) of U.S. Provisional Patent Application No. 61/666,856 filed Jun. 30, 2012, all of which applications are hereby incorporated by reference in their entireties into this application.

FIELD OF THE INVENTION

The present invention relates to a bed rail and specifically to a bed rail having a base frame and a guard frame where the base frame is disposed between a mattress and a box spring and where the guard frame has an operating position at the side of the mattress and a stored position in the base frame between the mattress and box spring.

BACKGROUND OF THE INVENTION

A conventional bed rail may include several problematic features. First, a conventional bed rail may include a plethora of parts. With the great many parts, a user may assemble a guard frame that is an unintended structure, that does not function as intended, and that is not safe. Second, a conventional bed rail may include a guard frame that permanently stays on the exterior of a bed. This type of guard frame has a permanent pivot such that the guard frame can swing up to a night position to prevent a person from rolling out of bed at night and that can swing down to a lowered position during the day. Permanent pivots are relatively easy to develop and manufacture and integrate with the remaining features of the conventional bed rail but offer no solution to finding a substantially out of sight and out of the way location for the guard frame.

SUMMARY OF THE INVENTION

A feature of the present invention is a guard frame that is constructed to have four units for assembly by the end user. The four units have support members of different diameters and of different connecting ends to minimize or eliminate the chance that the end user assembles the guard frame in an unintended fashion.

Another feature of the present invention is the combination of a first seat and a second seat. The first seat seats a pivot. The pivot, extending from the guard frame, drops down into the first seat after the guard frame and pivot have been pulled out of the tucked away position. The pivot then pivots in the first seat as the guard frame swings from a pulled out position up to a position at the side of the bed. The second seat seats a biased piece. The biased piece slides axially on a support member of the guard frame and automatically engages the second seat as the guard frame is swung upwardly to the position at the side of the bed.

Another feature of the present invention is an integral and one-piece junction rigidly retaining a lateral support member of the guard frame, a longitudinal support member of the guard frame, and a pivot of the guard frame. The junction minimizes play among the longitudinal and lateral support members and the pivot.

Another feature of the present invention is a biased apparatus having a collar sliding on a lateral support member of the guard frame and automatically engaging a second seat of a base apparatus. The collar is finger and thumb friendly for ease of operation when the biased apparatus is to be disengaged from the second seat.

Another feature of the present invention is the combination of a second seat being confronted by a biased apparatus from above and by a one-piece junction from below. The snug fit of the junction, second seat, and biased apparatus minimizes play among such parts and contributes to a guard frame that is secure when in the operating position.

Another feature of the present invention is a proximal plastic piece on the proximal end of a base support that covers a base of a second seat, that covers a proximal end of a slotted tube, and that extends into a slot on the slotted tube.

Another feature of the present invention is a distal plastic piece on the distal end of the base support that permits the guard frame to be easily connected to a base support, that includes a wide platform to minimize the chances that the base support will spin under the weight of the guard frame, and that includes a tortuous path to minimize the chances that the guard frame will slide out of the distal end of the base support.

Another feature of the present invention is a tube between the proximal and distal ends of the base support, where the tube includes a sliding portion that slidingly engages the guard frame, and legs depending from the proximal and distal ends of the base support to space the sliding portion of the tube from the upperside of the box spring to provide vertical space between the box spring and mattress for an easier sliding of the guard frame.

Another feature of the present invention is a second counter member that is permanently engaged to the base support so that the end user is more likely utilize the second counter member, where the second counter member is engaged to a distal end of a strap, where a proximal end of the strap is engaged to a proximal end of the base support, and where the body of the strap runs through a pinch apparatus on the proximal end of the base support and further runs through an opening formed in the distal end of the base support.

Another feature of the present invention is a predefined first distance between a) a biased piece that automatically locks the guard frame into an operating position and b) the uppermost surfaces of a junction and a predefined second distance between a) the bottom of a seat for a pivot of the guard frame and b) the bottom surfaces of a seat for the biased piece, where the first and second predefined distances are substantially equal such that the automatic locking of the guard frame is possible only when the pivot is seated in the bottom of the seat.

Another feature of the present invention is a sheeting that covers the guard frame, that permits operation of a biased apparatus for locking and unlocking the guard frame to and from the operating position at the side of the bed, and that is easily removable for cleaning.

An advantage of the present invention is that the support members that make up the guard frame will make up no other structure except the intended structure. That is, only by destroying the integrity of the parts can a user build an unintended structure. One feature contributing to this advantage is the four-piece guard frame where two of the pieces are C-shaped, where two of the pieces are L-shaped, where male and female connections are strategically placed on the junctions between the four pieces, and where junctions within the pieces are permanent.

Another advantage of the present invention is strength. The guard frame holds fast in the operating position at the side of a mattress. One feature contributing to this advantage is the plastic junction. The plastic junction encases two support members and a pivot to minimize play at a location that includes a first seat for the pivot. Further, by confronting the second seat from below, the plastic junction minimizes play of the second seat, a part that engages the biased piece and locks the guard frame to the base support.

Another advantage of the present invention is ease of operation. The biased piece includes a collar having tapering surfaces that extend outwardly and upwardly so as to be easy for a finger and thumb to engage.

Another advantage of the present invention is ease of assembly. The male/female connections of the guard frame are quick connect connections such that the guard frame, with the sheeting, can be quickly assembled. The guard frame is then slid quickly and easily into an envelope like sheeting that is zipped shut. The sheeted guard frame is then quickly engaged to the base supports by inserting the pivot of the guard frame into longitudinally disposed openings in a distal plastic piece on the base support.

Another advantage of the present invention is stability without a cross piece. The base supports have a distal plastic piece with a laterally projecting wide platform that, for example, counters the weight of the guard frame that is placed on the laterally projecting second seat.

Another advantage of the present invention is that the bed rail is inexpensive to manufacture and includes a minimum of parts.

Another advantage of the present invention is that entangling of sheets and other flexible bed coverings are minimized. The base apparatus includes a tube having merely a longitudinal slot. The junction is one-piece and integral to minimize a pinching of such sheets between a meeting of lateral and longitudinal support members and a pivot.

DESCRIPTION

Figure 1A:
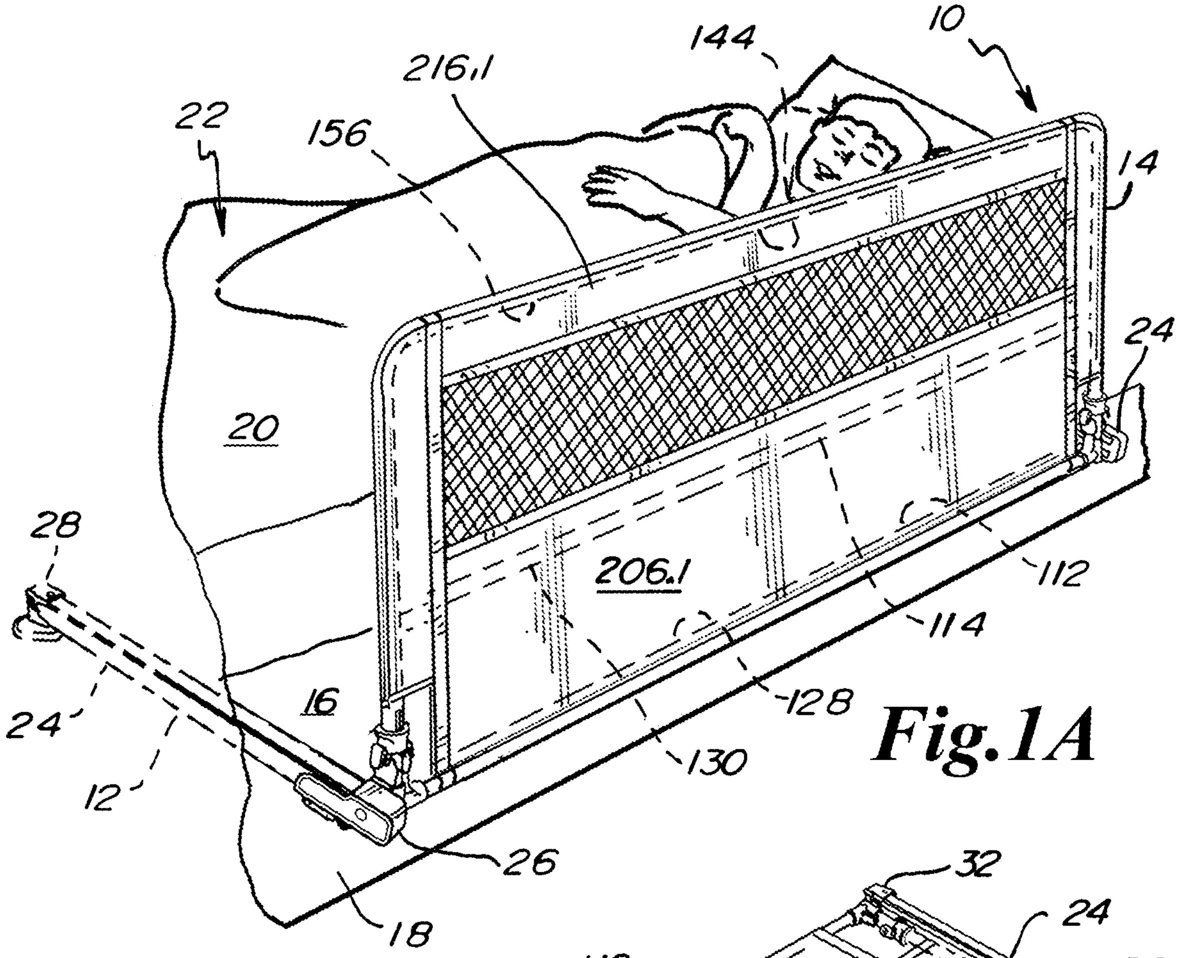
FIG. 1A is a perspective, partially phantom view of the present bed rail on a bed where the base frame of the bed rail is between the mattress and the box spring and the guard frame of the bed rail is at the side of the mattress and extends above the sleeping surface of the mattress to prevent a person from falling out of the bed.

As shown in the FIG. 1A, the present bed rail is identified by reference number 10. Bed rail 10 generally includes a base frame 12 and a guard frame 14. The bed rail 10, including the base frame 12 and guard frame 14, is a unitary structure. In use, the base frame 12 remains between a mattress 16 and a box frame 18. In use, the guard frame 14 confronts the side of the mattress 16 and projects above a sleeping surface 20 of the mattress 16. When not in use at the side of the mattress 16, the guard frame 14 is slid into the base frame 12 and thus, when not in use, the guard frame 14 is between the mattress 16 and the box frame 18 of a bed 22.

FIG. 1A shows that the base frame 12 includes a pair of base supports 24. Base support 24 lies on the box frame 18 and underneath the mattress 16. More specifically, base support 24 lies on bed sheets or other fabric or cloth material that are typically found on box frames and lies underneath bed sheets or other fabric or cloth material that are typically found on mattresses.

Figure 3A:
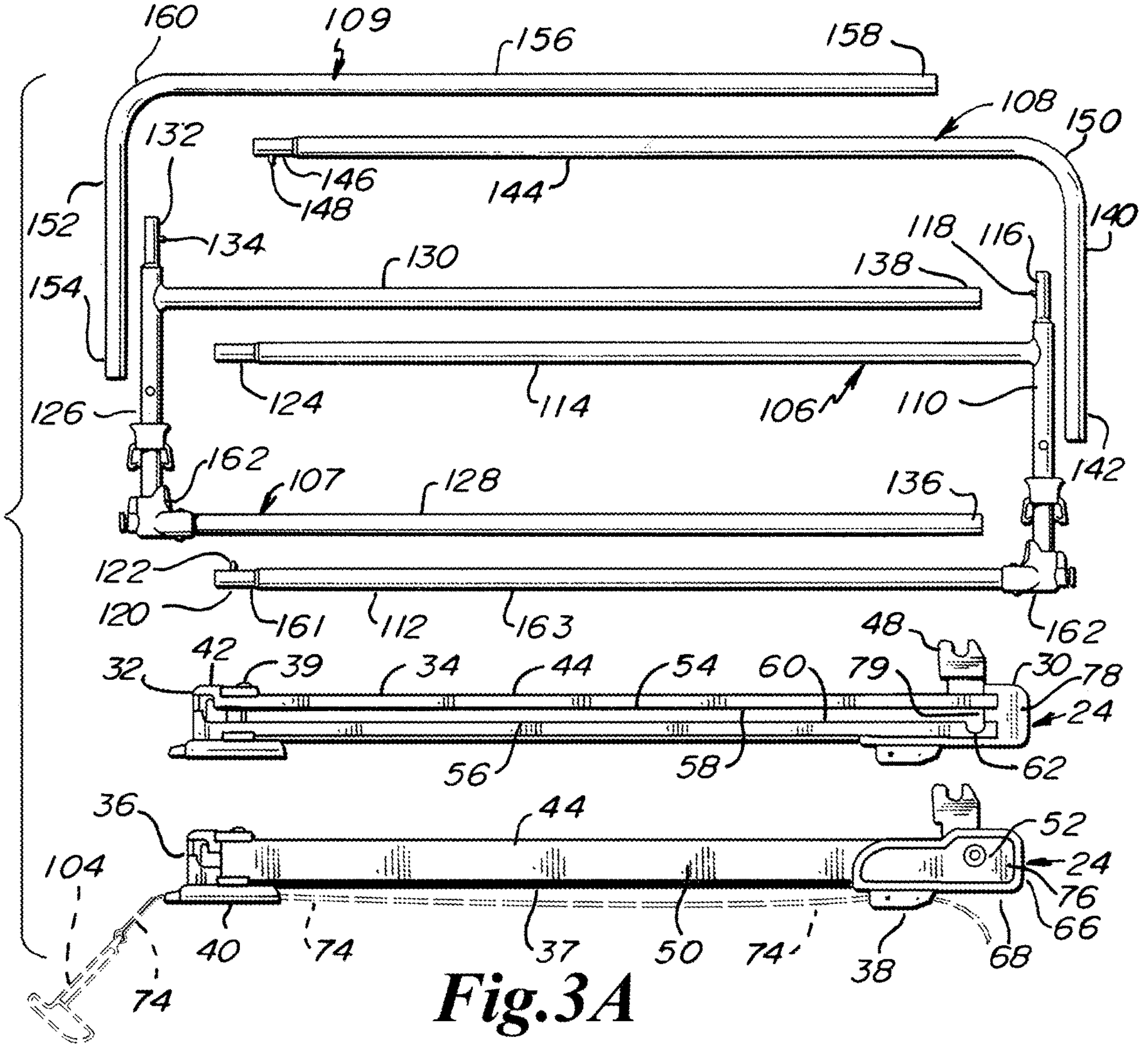
FIG. 3A is an exploded view of the bed rail of FIG. 2A.

As shown in FIG. 1A, base support 24 includes a proximal end 26 and a distal end 28. As shown in FIG. 3A, base support 24 includes a plastic piece 30 at the proximal end 26, a plastic piece 32 at the distal end 28, and a slotted tube 34 intermediate of the plastic pieces 30, 32.

Slotted tube 34 is elongate. In cross section, slotted tube 34 is square or rectangular. Slotted tube 34 includes six sides. Two of these sides are open ends. One open end is found at the proximal end 26 and the other open end is found at the distal end 28. Proximal plastic piece 30 closes off the proximal open end of slotted tube 34. Distal plastic piece 32 includes a section 36 that is spaced from the distal open end of the slotted tube 34.

A third side of the slotted tube 34 is an underside 37. Proximal plastic piece 30 is riveted by a first proximal rivet to this underside 37 adjacent a buckle 38 of proximal plastic piece 30, which proximal rivet extends and engages only this underside 37. Distal plastic piece 32 by a distal rivet 39 that engages a bottom portion 40 of distal plastic piece 32, a top portion 42 of distal plastic piece 32, and a top side 44 of slotted tube 34. Other than openings for the proximal rivet and distal rivet 39, underside 37 is solid from its proximal end to its distal end.

A fourth side of the slotted tube 34 is the top side 44. A base 46 for a guard frame seat 48 is welded to the proximal end of the top side 44. The distal end of the top side 44 is engaged by the rivet 39 for holding distal plastic piece 32. Other than the opening for the distal rivet 39, the top side 44 is solid from its proximal end to its distal end.

A fifth side of the slotted tube 34 is an outer side 50. The proximal end of the outer side 50 is engaged by a second proximal rivet 52, which engages the plastic piece 30 and the outer side 50. Other than the opening for the second proximal rivet 52, the outer side 50 is solid from its proximal end to its distal end.

A sixth side of the slotted tube 34 is an inner side 54. Inner side 54 has an elongate slot 56 formed therein. The proximal end of the slot 56 includes an open end that is closed off by a section of proximal plastic piece 30 extending a short way into the open end of the slot 56. The distal end of the slot 56 is an open end. An upper edge 58 forming slot 56 is straight from the proximal end of inner side 54 to the distal end of inner side 54. A lower edge 60 forming slot 56 is straight from the proximal end of inner side 54 to the distal end of inner side 54, except that the lower edge 60 includes a seat 62 formed therein at the proximal end of slotted tube 34.

Proximal plastic piece 30 is fixed to slotted tube 34 with two proximal rivets, including rivet 52. Plastic piece 30 serves as a sturdy base for buckle or pincher mechanism 38. Plastic piece 30 further serves as a stop for the guard frame 14 when it is being slid out of the base frame 12. Plastic proximal piece 30 further serves as a friendly or gentle cover to proximal end of the slotted tube 34, which is preferably formed of a metal such as aluminum or steel. The proximal end of base support 24 protrudes horizontally from the junction of the mattress 16 and box spring 18 and the plastic proximal piece 30 may make contact with the leg or hand of a person. The plastic proximal piece 30 minimizes the chance of the metal end of the slotted tube 34 coming into contact with an arm or a leg. Proximal plastic piece 30 includes a top section 64 that runs parallel to the top side 44 and that covers base 46. Curving down from and integral with the top section 64 is a front section 66. Front section 66 closes of the open front end of slotted tube 34 and extends at a right angle to top section 64. Front section 66 curves integrally into a bottom section 68. Bottom section 68 runs parallel to top section 64. Bottom section 68 runs further inwardly than top section 64. Bottom section 68 mounts buckle or pincher mechanism 38. Bottom section 68 is riveted to the underside 37, with such rivet located between two sides 70. Sides 70 pivotally mount a swinging lever 72 that pinches a strap 74 between the distal end of the lever 72 and the bottom section 68 of piece 30. Plastic piece 30 further includes an outer side section 76 that runs parallel to outer side 50 and that abuts and confronts outer side 50. Outer side section 76 is integral with top section 64, front section 66 and bottom section 68. Outer side section 76 is riveted to outer side 50 with rivet 52. Outer side section 76 and bottom section 68 run inwardly and terminate at the same location so as to be the same length as the other. Plastic piece 30 further includes an inner side section 78. The surface of inner side section 78 is flush with the surface of inner side 54 of slotted tube 34. Inner side section 78 includes a stem or tab 79 that extends into slot 56, which tab or stem 79 terminates immediately at the beginning of seat 62. Inner side section 78 runs into and is integral with top section 64, front section 66, bottom section 68 and outer side section 76. Inner side section 78 runs parallel to outer side section 76.

Proximal end 26 of base support 24 further includes the base 46 and the seat 48. A portion of base 46 is on the top side 44 of slotted tube 34 and is welded to the top side 44. Another portion of base 46 projects inwardly. Base 46 is a flat metal piece. Seat 48 is generally in the form of a cube or parallelepiped without a top, without a bottom, and without a side, such that three sides remain. A first side of the seat 48 is an outer side 80. Side 80 rises integrally from base 46. A second side of the seat 48 is distal side 82. Distal side 82 is integral with outer side 80 and extends at a right angle to outer side 80. A third side of the seat 48 is an inner side 84. Inner side 84 is integral with the distal side 82. Inner side 84 extends at a right angle to distal side 82 and extends parallel to outer side 80. Outer side 80, distal side 82 and inner side 84 form a U-shape. As a whole, base 46, outer side 80, distal side 82 and inner side 84 is one-piece and integral. Seat 48 is rigid as a unit. Seat 48 is rigidly fixed to slotted tube 34. Seat 48 is set inwardly of the absolute end of the slotted tube 34 and is set inwardly of the absolute proximal end of the base support 24.

Outer side 80 includes a U-shaped slot 86. Inner side 84 also includes a U-shaped slot 86. The slots 86 are laterally aligned with each other and extend to the same depths in their respective sides 80, 84. The pair of slots 86 on one base 24 are laterally aligned with the pair of slots on the other base 24. Slots 86 are open ended and open upwardly.

Outer side section 76 and inner side section 84 include an oblique edge 88 running vertically and rearwardly. Oblique edge 88 can be referred to as a guide.

Distal plastic piece 32 includes above referenced bottom portion 40. Bottom portion 40 is in the nature of a platform having a relatively great amount of surface area so as to minimize the distal end 28 of the base support 24 digging into or being depressed into a resilient box spring. This relatively great amount of surface area includes a relatively great lateral distance, where lateral is defined as the direction from outer side 50 to the inner side 54 of slotted tube 34. This relatively great amount of surface area includes a relatively great longitudinal distance, where longitudinal is defined as the direction from proximal end 26 to distal end 28 of base support 34. The lateral expanse of bottom portion 40, at its greatest width, is about three times the lateral expanse of slotted tube 34. The longitudinal expanse of bottom portion 40, at its greatest length, is about twice the lateral expanse of slotted tube 34.

Bottom portion 40 includes a pair of retainers or ridges 90 running laterally. A distance between inner surfaces of the ridges 90 is about equal to the lateral expanse of slotted tube 34. The ridges 90 abut the slotted tube 34 at the outer and inner side sections 50, 54 of the slotted tube 34 and prevent the slotted tube 34 from pivoting about the rivet 39.

Disposed inwardly of and parallel to the ridges 90 are sidewalls 92. Sidewalls 92 are aligned so as to be rectilinear or straight with the outer side section 50 and the inner side section 54 of slotted tube 34. Proximal most ends of sidewalls 92 abut distal most ends of outer and inner side sections 50, 54 such that sidewalls 92 are effectively continuations of outer and inner side sections 50, 54.

The sidewalls 92 run rearwardly from the outer and inner side sections 50, 54 to an end wall 94. End wall 94 runs at a right angle to the sidewalls 92 and connects the bottom portion 40 of distal piece 32 to the top portion 42 of distal piece 32. End wall 94 has formed therein a pair of openings 96. Each of the openings 96 leads into a stepped slot 98 formed between the bottom and top portions 40, 42. The stepped slot 98 in turn leads into the slot 56 of the slotted tube 34.

The opening 96 and stepped slot 98 are a means to get the guard frame 14 into engagement with the base frame 12. Distal end 28 of the base support 24 is an open end relative to the guard frame 12 such that the guard frame 12 can be slid into and out of the distal plastic piece 32. The proximal end 26 is a closed end. Proximal end 26 is closed off by the proximal plastic piece 30 such that the guard frame 14 cannot slide out of the proximal end 26.

It should be noted that, after distal plastic piece 32 is mounted on the slotted tube 34, only one of the opening 96 and stepped slot 98 is used, depending upon whether the distal plastic piece 32 is mounted on the right or left base support 24.

Distal plastic piece 32 further includes a strap opening 100 formed by a U-shaped piece 102. Strap 74 is guided by the opening 100 and is further guided by the opening formed in buckle 38.

Slotted tube 34 includes the inner side section 54 and this inner side section 54 includes the slot 56. Base 46 projects from outer side section 50 to and beyond this inner side or inner side section 54 and seat 48 is found at a lateral spaced location wholly beyond inner side section 54. Pressure by the guard frame 14 may tend to spin the base support 24 on a longitudinal axis. The extension of the platform 40 laterally and inwardly tends to minimize the tendency of the base support 24 to spin based upon pressure from the guard frame 14 since the lateral and inward extension of the platform 40 and the seat 48 are found on the same inward side of base support 24.

The base frame 12 squeezes the mattress 16 between the rear or distal side 82 of the seat 48 and a counter member 104. Counter member 104 is engaged to the distal end of the strap 74. Counter member 104 is a rigid piece that includes an upward extension to abut the distal side of the mattress 16 and that may further include a downward extension to abut the distal side of the box spring 18. The counter member 104 is drawn tightly by pulling on the proximal end of the strap 74 that protrudes through opening 100, along the underside 37 of slotted tube 34, and through pincher mechanism 38. The proximal end of the platform 40 includes an inverted or downwardly opening slot that guides the strap 74. Further, a rib on the underside of the platform 40 that extends from one side of the platform 40 to the other side of the platform 40 includes an inverted or downwardly opening slot that guides the strap 40 such that platform 40 can lay flat on a surface, such as on the top of box spring 18, and be drawn freely one way or be permitted to be freely loosened the other way.

Along with the body of platform 40, the U-shaped piece 102 forms the strap opening 100. Strap 74 extends upwardly and rearwardly through opening 100. Then strap 100 continues on to the counter member 104 that engages the distal side of the mattress 16. By engaging the lateral running portion of piece 102, the strap 74 aids in keeping the distal end 28 flat against the top of the box spring 18. By engaging the longitudinally running portions of piece 102, the strap 74 aids in keeping the distal end 28 from being worked laterally inwardly or laterally outwardly.

Base frame 12 includes generally two pieces or units, i.e., a first or right base support 24 and a second or left base support 24. Guard frame 14 includes generally four pieces or units, i.e., two generally C-shaped tubular pieces 106, 107 and two L-shaped tubular pieces 108, 109.

C-shaped piece 106 includes a tubular support member 110, a lowermost horizontally extending tubular support member 112, and an intermediate horizontally extending tubular support member 114. Member 110 runs at a right angle or transversely to members 112 and 114. Members 112 and 114 run parallel to each other. When the guard frame 14 is tucked away in the base frame 12, the tubular support member 110 extends generally horizontally. When the guard frame 14 is upright confronting the side of mattress 16, the tubular support member 110 extends generally vertically.

Vertically extending support member 110 includes a tubular male connection 116 having a button 118. Button 118 is spring biased and has a normal position outside of the tubular male connection 116. Button 118 is resiliently depressable inwardly into male connection 116. The diameter of male connection 116 is less than the diameter of the remainder of vertically extending support member 110.

Lowermost horizontal support member 112 includes a male connection 120 at the innermost end of member 112. Male connection 120 includes button 122. Button 122 is spring biased and has a normal position outside of the tubular male connection 120. Button 122 is resiliently depressable inwardly into male connection 120. The diameter of male connection 120 is less than the diameter of the remainder of horizontally extending support member 112.

Intermediate support member 114 includes a tubular male connection 124 at the innermost end of member 114. Male connection 124 includes no button. The diameter of male connection 124 is less than the diameter of the remainder of intermediate support member 114.

C-shaped piece 107 includes a tubular support member 126, a lowermost horizontally extending tubular support member 128, and an intermediate horizontally extending tubular support member 130. Member 126 runs at a right angle and transversely to members 128 and 130. Members 128 and 130 run parallel to each other. When the guard frame 14 is tucked away in the base frame 12, the tubular support member 126 extends generally horizontally. When the guard frame 14 is upright confronting the side of mattress 16, the tubular support member 126 extends generally vertically.

Vertically extending support member 126 includes a tubular male connection 132 having a button 134. Button 134 is spring biased and has a normal position outside of the tubular male connection 132. Button 134 is resiliently depressable inwardly into male connection 132. The diameter of male connection 132 is less than the diameter of the remainder of vertically extending support member 126.

Lowermost horizontal support member 128 includes a female connection 136 at the innermost end of member 128. Female connection 136 includes a tubular opening at the innermost end and receives therein male member 120. Female connection 136 further includes a laterally extending hole to receive button 122. The diameter of female connection 136 is the same as the diameter of the remainder of horizontally extending support member 128.

Intermediate support member 130 includes a tubular female connection 138 at the innermost end of member 130. Female connection 138 includes a tubular opening at the innermost end and receives therein male member 124. The diameter of female connection 138 is the same as the diameter of the remainder of intermediate support member 130.

L-shaped tubular support member 108 includes a straight portion 140 that is vertically when the guard frame 14 is upright and that is horizontal when the guard frame 14 is tucked away in the base frame 12. Straight portion 140 includes an end or female connection 142 that receives male connection 118. The end or female connection 142 further includes a laterally disposed opening for receiving button 118.

L-shaped tubular support member 108 further includes straight portion 144 that extends horizontally. At its innermost end, straight portion 144 includes a male connection 146 having a button 148. Button 148 is spring biased and has a normal position outside of the tubular male connection 146. Button 148 is resiliently depressable inwardly into male connection 146. The diameter of male connection 146 is less than the diameter of the remainder of straight portion 144.

L-shaped tubular support member 108 further includes a curved portion 150 that is intermediate straight portions 140, 144.

L-shaped tubular support member 109 includes a straight portion 152 that is vertical when the guard frame 14 is upright and that is horizontal when the guard frame 14 is tucked away in the base frame 12. Straight portion 152 includes an end or female connection 154 that receives male connection 132. The end or female connection 154 further includes laterally disposed opening for receiving button 134.

L-shaped tubular support member 109 further includes straight portion 156 that extends horizontally. At its innermost end, straight portion 156 includes an end or female connection 158 for engaging male connection 146. End or female connection 158 includes a laterally disposed opening to receive button 148.

L-shaped tubular support member 109 further includes a curved portion 160 that is intermediate straight portions 152, 156.

C-shaped pieces or units 106, 107 and L-shaped pieces or units 108, 109 engage each other to make up guard frame 14. There are five connections to be made to construct the guard frame 14. These five connection are #1) the connection between male end 120 and female end 136, #2) the connection between male end 124 and female end 138, #3) the connection between male end 116 and female end 142, #4) the connection between male end 132 and female end 154, and #5) the connection between male end 146 and female end 158. It should be noted that connections #3 and #4 can be reversed, i.e., male end 116 can connect to female end 154 and male end 132 can connect to female end 142. It should be noted that even if connections #3 and #4 are reversed, the guard frame 14 assumes no change in structure or function.

The structures of the C-shaped pieces 106, 107 and L-shaped pieces 108, 109 eliminate the chance of an assembling of an incorrect or nonfunctional guard frame 14. For example, if a user fits male end 120 into female end 138 and then fits male end 124 into female end 136, then male ends 116 and 132 will be pointing in opposite directions and the user will find that button 122 will find no laterally disposed hole in female end 138 into which the button 122 can pop. Perhaps a user will fit male end 146 into female end 136; however, no guard rail portion 14 will result from this step. After the pieces or units 106, 107, 108, and 109 have been engaged such that there are no free ends or connections, the only result is the guard frame 14 such that safety is maximized.

Units 106, 107, 108, 109 have support members having main bodies, ends, annular stops and transverse pieces engaged by other support members. For example, support member 112 includes an annular stop 161, a main body 163, a male end 120 and a transverse piece or button 122. Main body 163 of support member 112 is found between a junction 162 and the annular stop 161. Annular stop 161 is formed by a change in the diameter from main body 163 to end 120, namely a reduction in the size of the diameter from main body 163 to end 120. Main body 163 is a cylindrical tube and end 120 is a cylindrical tube. The annular stop 162 stops the sliding of end 163 onto support member 112.

Support member 128 that mates with support member 112 includes a main body, a female end 136, and a hole for transverse piece or button 122. The main body for support member 128 is disposed between the junction 162 to which it is fixed and the female end 136.

Support member 114 includes a main body, an annular stop, male end 124, but no button or transverse piece. The tube portion of member 114 that makes up the male end 124 is solid and continuous so that a user will not associate this male end with a female end having a button opening. The main body of member 114 is disposed between the annular stop and support member 110.

Support member 130 that mates with support member 114 includes a main body and a female end 138. The female end or tube portion into which end 124 fits is solid and continuous so that a user will not associate this female end with a male end that has a button. The main body of member 130 is disposed between end 138 and support member 126.

L-shaped piece 108 is a support member or a bent support member. Piece 108 has an integral elongate section 140 extending at a right angle to integral elongate section 144. Piece 108 includes a male end 146, an annular stop between end 146 and section 144, and a female end 142. The main body of piece 108 is found between the annulus and the female end 142.

L-shaped piece 109 is a support member or a bent support member. Piece 109 has an integral elongate section 152 extending at a right angle to integral elongate section 156. Piece 109 has no annular stop. Piece 109 has a female end 154 and a female end 158 and a main body extending between the female ends or tube portions 154, 158.

The main bodies of support members 110 and 126 have the same first diameter, and this first diameter is the same as the diameter of the main bodies of L-shaped pieces 108, 109. The female ends of support members 110, 126 and of piece 108 slide over and closely confront their respective male ends and come to a stop at the respective annular stops.

The main bodies of support members 112, 128, 114 and 130 have the same second diameter and this second diameter is of a different size, namely a smaller diameter, than the first diameter of members 110, 126 and pieces 108, 109. The female ends of support members 128, 130 slide over and closely confront their respective male ends and come to a stop at the respective annular stops.

With the different first and second diameters, if a user attempts to place one of the female ends 158, 154, or 142 of pieces 108, 109 upon any of the ends 120, 136, 124, or 138 of pieces 106, 107, no mating or connection occurs. Instead, such female ends 158, 154, or 142 continue sliding a great distance on to the support members of such ends and over an annular stop if one exists. Or, for example, if a button of a male end snaps into the button hole of end 158, 154, or 142, such is a loose relationship with a significant amount of lateral play that the user will recognize as not being a mating or a connection. If a user attempts to place end 120 into end 138, the user will recognize that such is not a mating because end 138 has no button hole. If a user attempts to place end 124 into end 136, the user will recognize that such is not a mating because end 136 will have a button hole and end 124 does not have a button. Any two combinations of ends 142, 154 and 158 cannot connect because these ends are female ends of the same diameter.

Support members 110, 126, 112, 128, 114, 130 of pieces 106, 107 are tubular and pieces 108, 109 are tubular. These support members and pieces may be formed of a metal such as aluminum or stainless steel.

The junction 162 secures a connection between side support member 110 and bottom support member 112. Junction 162 is also found between side support member 126 and bottom support member 128 and junction 128 will be described with respect to members 126, 128.

Junction 162 includes a first socket 164 for receiving an end of support member 128. First socket 64 includes cylindrical surface portions on its exterior and interior surfaces. A rivet 166 extends through opposing sections of the first socket 164 and further extends through support member 128 to keep support member 128 engaged to junction 162.

Junction 162 includes a second socket 168 extending at a right angle to first socket 164. First and second sockets 164, 168 are integral and one-piece. Second socket 168 includes cylindrical surface portions on its exterior and interior surfaces. An end of second socket 168 is flat and tangential with a longitudinal exterior surface portion of first socket 164, which longitudinal exterior surface portion runs parallel to a longitudinal axis of support member 128.

Junction 162 further includes a U-shaped section 170 that hugs an inner portion of support member 126. U-shaped section 170 is integral and one-piece with first and second sockets 164, 168. An inner surface of U-shaped section 170 is at least partially cylindrical such that section 170 can hug an inner portion of support member 126. U-shaped section 170 has feet that extend integrally from first socket 164. An outer portion of U-shaped section 170 runs integrally into second socket 168. A curved portion of section 170 extends beyond second socket 168. The section 170 is adjacent to and confronts the bottom edge of side 84 of seat 48 when the guard frame 14 is in the upright and operating position.

Junction 162 further includes a third socket 174. First socket 164 extends inwardly from one side of socket 168. Third socket 174 extends outwardly from the other side of socket 168. Third socket 174 is coaxial with first socket 164. Third socket 174 engages a pin shaft or pivot 176 extending outwardly from third socket 174. Pin shaft 176 is coaxial with support member 128. Pin shaft 176 includes a pin head 178. A washer 180 is rigidly secured to the inner side of pin head 178 and is also rigidly secured to pin shaft 176. Washer 180 has a greater diameter than pin shaft 176 and pin head 178. Washer 180 has a diameter equal to or about equal to the outer end of third socket 174. Pin shaft 176, pin head 178 and washer 180 rotate as one unit or one pivot in third socket 174, though rotation is not necessary. Pin shaft 176 is retained in third socket 174 such that pin shaft 176 does not slide in the axial direction, i.e., inwardly or outwardly relative to support member 128.

Junction 162 further includes a plate piece or flat piece 182 that extends integrally from the third socket 174 and that further extends integrally from the second socket 168. Piece 182 includes an end 184. When guard frame 14 is in the upright and operating position, end 184 of piece 182 is adjacent to and confronts base 46 of seat 48. Specifically, end 184 is adjacent to and confronts the portion of base 46 that extends inwardly beyond the inner side 54 of slotted tube 34. Piece 182 is coplanar with the guard frame 14 as a whole.

The diameters of washer 180 and the outer end of third socket 174 are greater than the width of slot 56 of slotted tube 34 such that washer 180 cannot be pulled laterally out of slotted tube 34 and such that the third socket 174 cannot be pushed laterally into slot 56. The width of slot 56 is a vertical distance between upper edge 58 and lower edge 60.

The diameters of washer 180 and the outer end of third socket 174 are greater than the width of seat 62 such that washer 180 cannot be pulled laterally out of seat 62 and such that third socket 174 cannot be pushed laterally into slotted tube 34.

The diameters of washer 180 and the outer end of third socket 174 are greater than the width of stepped slot 98 such that washer 180 cannot be pulled laterally out of stepped slot 98 and such that third socket 174 cannot be pushed laterally into distal plastic piece 32.

Opening 96 are of a greater size than the diameter of washer 180 to permit the washer 180 to slide therein such that opening 96 becomes the point of first engagement between the guard frame 14 and base frame 12 when the bed rail 10 is being assembled.

Guard frame 14 further includes a plunger apparatus 186. Plunger apparatus 186 includes a collar 188 that rides in the axial direction on side support member 126 (or side support member 110). Collar 188 surrounds side support member 126 for 360 degrees. At one end, collar 188 includes lateral projections 190. One lateral projection 190 extends inwardly. The other lateral projection extends outwardly. The lateral projections 190 function as finger grips to make is easy for the user to slide collar 188 in the axial direction away from junction 162. The lateral projections 190 are diametrically opposing surfaces that extend away from each other as the diametrically opposing surfaces run away from or in the opposite direction of the pivot 176 or junction 162.

At the other end of collar 188, opposite of lateral projections 190, collar 188 includes tabs 192 extending toward junction 162. Tabs 192, collar 188, and lateral projections 190 are one-piece and integral. One tab 192 is found on the inner side of collar 188. The other tab 192 is found on the outer side of collar 188. A pin 194 is engaged to and between the tabs 192 and extends through axial slots 196 formed in support member 126. One axial slot 196 is formed in the axial direction on the inner side of support member 126. The other axial slot 196 is formed in the axial direction on the outer side of support member 126. An expanding coil spring 198 is engaged between pin 194 and a pin 200 engaged between opposing inner and outer sides of support member 110. Pin 200 is in the nature of a rivet. The expanding coil spring 198 normally biases pin 194, tabs 192 and collar 188 in an axial direction toward junction 162.

Collar 188 slides in each of the axial directions on support member 110. Collar 188 is restricted from rotation about support member 110 by the pin 194 extending through the axial slots 196.

Tabs 192 include rounded or curved inner portions or nubs or biased pieces 202. Nubs 202 are integral with tabs 192 and are further integral with collar 188. Pin 194 extends laterally through tabs 192 and through nubs 202. Nubs 202 interact with and become seated in the U-shaped slots 86 of outer and inner sides 80, 84 of seat 48. As guard frame 14 is being pivoted to an upright and operating position, nubs 202 begin to slide against edges 88 of sides 80, 84 of seat 48 and, in doing so, push the collar 188 upwardly against the force of the expansion spring 198. Nubs 202 eventually reach the upper end of edge 88, slide over a top of sides 80, 84, and then pop down into U-shaped slots 86 under the force of the expansion coil spring 198. Once seated in slots 86 of seat 48, the nubs 202 of each of the collars 188, found on the opposing side support members 110, 126, hold the guard frame 14 in an upright and operating position against the side of the mattress 16.

Guard frame 14 includes sheeting 204. Sheeting 204 provides a barrier or wall to prevent a person from rolling or falling out of the bed 22. Guard frame 14 provides the support or frame for the sheeting 204. Sheeting 204 is stretched between spaces in the guard frame 14 and, at the same time, provides corner spaces to permit a user to slide and swing the guard frame 14 to an upright position and to swing and slide the guard frame 14 to a tucked away position in the base frame 12. Sheeting 204 is flexible.

Sheeting 204 includes a nylon fabric lower panel 206. Panel 206 extends from a lateral front edge 208, shown in FIG. 3B, to a lateral rear edge 210, shown in FIG. 2B. In extending from front edge 208 to rear edge 210, panel 206 extends down to, about, and upwardly from the lowermost support members 112, 228. Panel 206 is further bounded by a first outer edge 212 and a second outer edge 214. Edges 212, 214 define a width of panel 206. Edges 212, 214 run to both the front and back sections of panel 206. Panel 206 is preferably formed of two-pieces or two sub-panels 206.1 and 206.2. One sub-panel 206.1 is found on one side of the guard frame 214 and the other sub-panel 206.2 of panel 206 is found on the other side of the guard frame 214. The sub-panels 206.1 and 206.2 are stitched together by stitching running adjacent to support members 112, 128.

Sheeting 204 further includes a nylon fabric upper panel 216. Panel 206 extends from a lateral front edge 218, shown in FIG. 3B, to a lateral rear edge 220, shown in FIG. 2B. In extending from front edge 218 to rear edge 220, panel 216 extends up to, about, and downwardly from the uppermost support members or straight portions 144, 156. Panel 216 is further bounded by a first outer edge 222 and a second outer edge 224. Edges 222, 224 define a width of panel 216. Edges 222, 224 run to both the front and back sections of panel 216. Panel 216 is one-piece and includes a front sub-panel 216.1 and a rear sub-panel 216.2. As a whole, prior to being stitched into sheeting 204, panel 216 takes the shape of a rectangle.

Figure 2B:
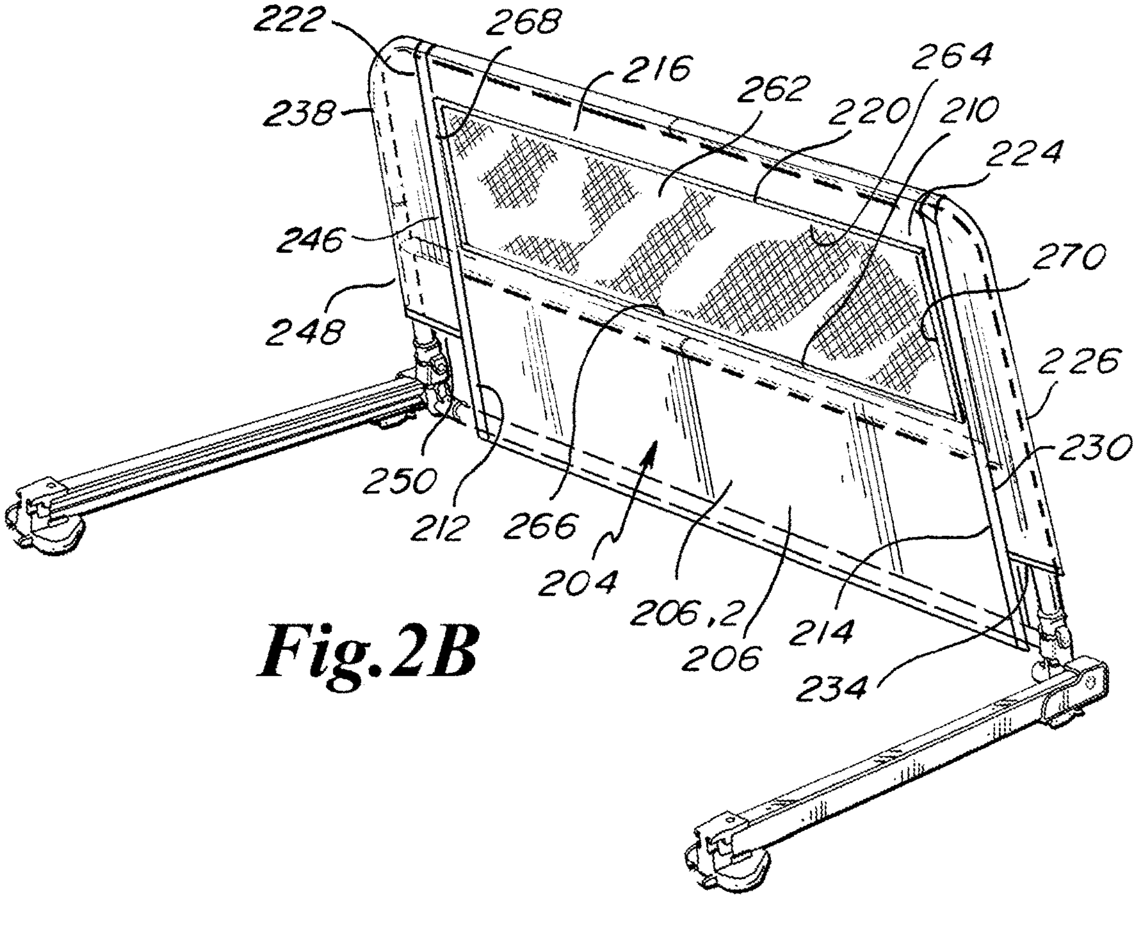
FIG. 2B is a perspective view of the bed rail of FIG. 2A with sheeting on the guard frame of the bed rail.
Figure 3B:
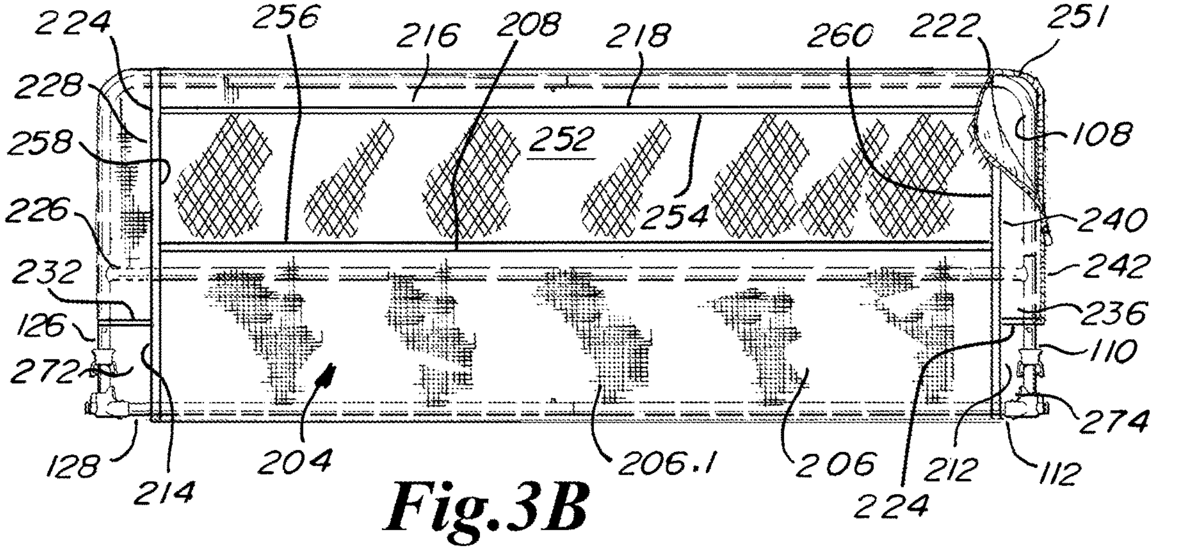
FIG. 3B is a front view of the bed rail of FIG. 1A.
Figure 4A:
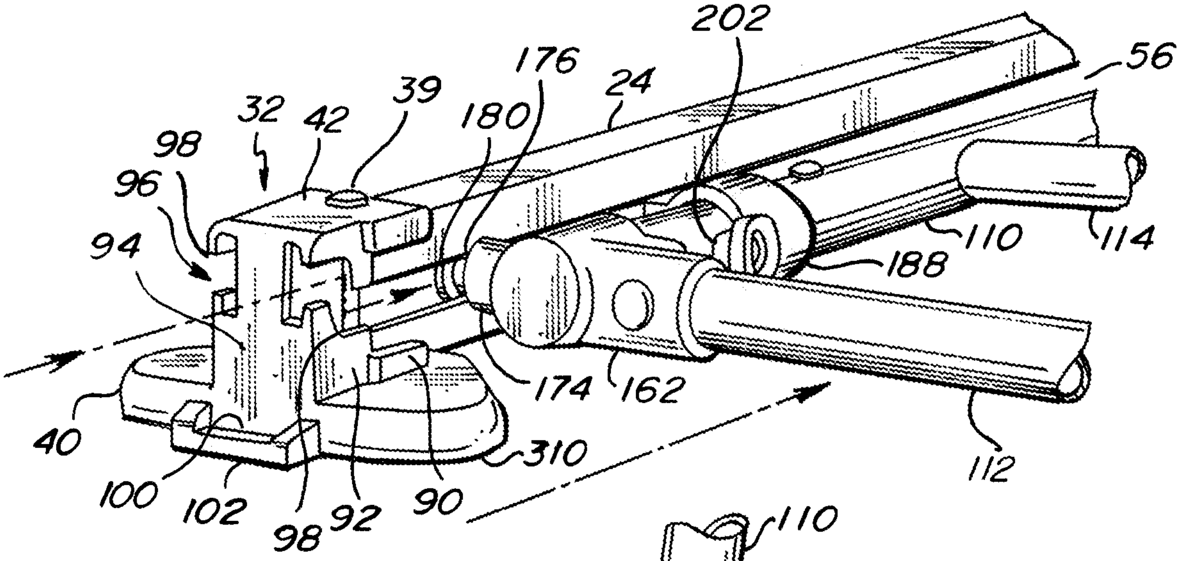
FIG. 4A is a detail perspective view of a section of the guard frame of the bed rail of FIG. 1A sliding in a section of the base frame of the bed rail.
Figure 4B:
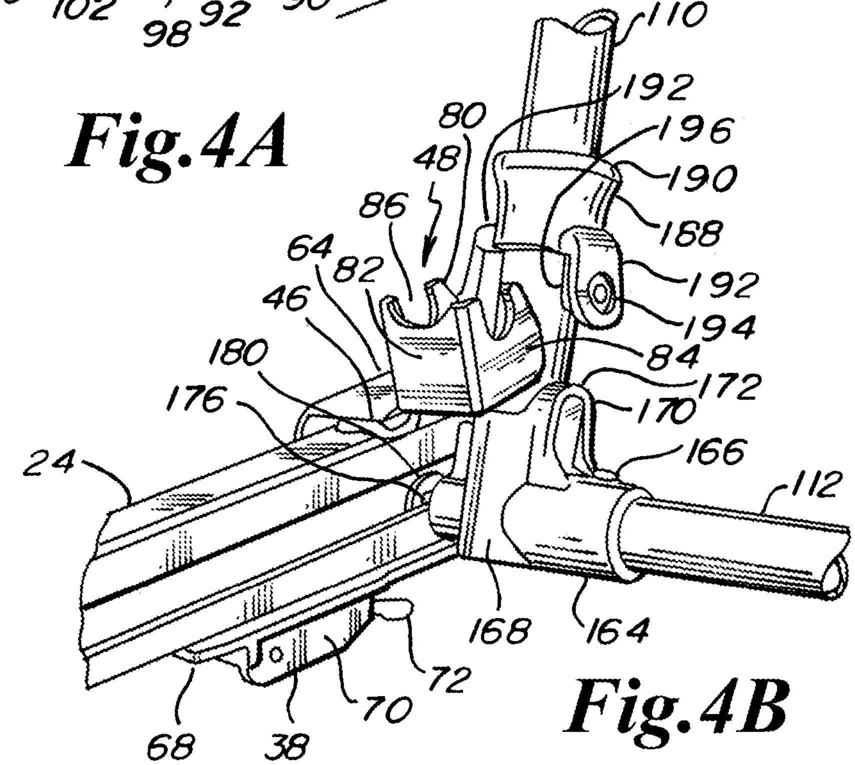
FIG. 4B is a detail perspective view of a section of the guard frame of the bed rail of FIG. 1A about to swing into engagement with a section of the base frame of the bed rail.

Sheeting 204 further includes a nylon fabric side panel 226. Panel 226 extends from a longitudinal front edge 228, as shown in FIG. 3B, to a longitudinal rear edge 230, as shown in FIG. 2B. In extending from front edge 228 to rear edge 230, panel 226 extends over to, about, and over from support member 126, straight portion 152, curved portion 160, and a section of straight portion 156. Panel 226 is preferably two-piece or includes two sub-panels, and with such two-pieces or two sub-panels being stitched to each other to form panel 226. Such stitching to form panel 226 follows the section of panel 226 running along the outer edges of support member 126, straight portion 152, curved portion 160, and a section of straight portion 156 such that each sub-panel of panel 226 forms generally a rectangle but with one corner of the rectangle having a radius. Panel 226 further includes a front lower lateral edge 232 and a rear lower lateral edge 234.

Sheeting 204 further includes a front nylon fabric side sub-panel 236 and a rear nylon fabric side sub-panel 238. When zipped together, sub-panels 236, 238 can be considered to be one panel that opposes side panel 226. Sub-panel 236 includes an inner edge 240 and an outer edge 242. Outer edge 242 meets inner edge 240 at the straight portion 144. Sub-panel 236 further includes a lower edge 244. Sub-panel 238 includes an inner edge 246 and an outer edge 248. Outer edge 248 meets inner edge 246 at the straight portion 144. Sub-panel 238 includes a lower edge 250. A zipper 251 mates the sub-panels 236, 238 at outer edges 242, 248, i.e., at fabric material that is adjacent to outer edges of a section of straight portion 144, curved portion 150, straight portion 140, and an upper section of support member 110.

Sheeting 204 further includes a front mesh or mesh panel 252. Panel 252 is rectangular and is bounded by lateral edges 254, 256 and longitudinal edges 258, 260. Lateral edge 254 is stitched to the lateral edge 218 of upper panel 216. Lateral edge 256 is stitched to lateral edge 208 of panel 206. Longitudinal edge 258 is stitched to longitudinal edge 228 of panel 226. Longitudinal edge 260 is stitched to edge 240 of sub-panel 236.

Sheeting 204 further includes a rear mesh or mesh panel 262. Panel 262 is rectangular and is bounded by lateral edges 264, 266 and longitudinal edges 268, 270. Lateral edge 264 is stitched to the lateral edge 220 of upper panel 216. Lateral edge 266 is stitched to lateral edge 210 of panel 206. Longitudinal edge 268 is stitched to longitudinal edge 246 of sub-panel 238. Longitudinal edge 270 is stitched to longitudinal edge 230 of panel 226.

Panel 206 is stitched at edge 208 to edge 256 of mesh 252, at edge 212 to edge 240 of sub-panel 236, at edge 214 to edge 258 of panel 226, at edge 210 to edge 266 of mesh 262, at edge 214 to edge 230 of panel 226, and at edge 212, to edge 246 of sub-panel 238.

Panel 216 is stitched at edge 218 to edge 254 of mesh 252, at edge 220 to edge 264 of mesh 262, at edge 224 to edge 258 of panel 226, at edge 222 to edge 240 of sub-panel 236, at edge 224 to edge 230 of panel 226, and at edge 222 to edge 246 of sub-panel 238.

Panel 226 is stitched at edge 228 to edge 214 of panel 206, at edge 228 to edge 258 of mesh 252, at edge 228 to edge 224 of panel 216, at edge 230 to edge 214 of panel 206, at edge 230 to edge 270 of mesh 262, and at edge 230 to edge 224 of panel 216.

Sub-panel 236 is stitched at edge 240 to edge 212 of panel 206, at edge 240 to edge 260 of mesh 252, and at edge 240 to edge 222 of panel 216.

Sub-panel 238 is stitched at edge 246 to edge 212 of panel 206, at edge 246 to edge 268 of mesh 262, and at edge 246 to edge 222 of panel 216.

It should be noted that the edges of the panels, sub-panels, and mesh panels of the sheeting 204 overlap to provide substantial basis for stitching and to provide strength between the panels, sub-panels, and mesh panels.

When zipper 251 is open, sub-panels 236, 238 are disengaged from each other. In this form, sheeting 204 forms an open pocket where mesh panel 252 is spaced from mesh panel 262, where the opposing sides or sub-panels of upper panel 216 are spaced from each other, where the opposing sides or sub-panels of lower panel 206 are spaced from each other, and where the opposing sides or sub-panels of panel 226 are spaced from each other. Guard frame 14, disengaged and standing alone from base frame 12, is then slid into such open pocket. Then zipper 251 is zipped shut such that sub-panels 236 and 238 form in effect one panel that extends to the front and back sides of the guard frame 14.

On the guard frame 14, edge 214 of panel 206 terminates short of, and is spaced from, junction 162. On the guard frame 14, edges 232, 234 of panel 226 terminate short of and are spaced from collar 188 and are further spaced from the position of the collar 188 when the collar 188 compresses expansion spring 198 to permit the collar 188 to slide away from junction 162 such that nubs 202 disengage from the seat 48 without the collar 188 hitting edges 232, 234. Edges 214, 232, and 234 form a window 272 with support members 126, 128.

On the guard frame 14, edge 212 of panel 206 terminates short of, and is spaced from, junction 162. On the guard frame 14, edges 244, 250 of sub-panels 236, 238 terminate short of and are spaced from collar 188 and are further spaced from the position of the collar 188 when the collar 188 compresses expansion spring 198 to permit the collar 188 to slide away from junction 162 such that nubs 202 disengage from the seat 48 without the collar 188 hitting edges 244, 250. Edges 212, 244, and 250 form a window 274 with support members 110, 112.

The nylon fabric material of panels 206, 216, and 226 and of the sub-panels 236 and 238 is translucent; it is difficult to see through this nylon fabric material. The mesh of mesh panels 252, 262 permits objects to be seen through the mesh material. The mesh of mesh panels 252, 262 impedes little the transmission of light through such mesh.

Panel 206 is wrapped about and covers over 90% of the support members 112, 128. From support members 112, 128, panel 206 extends beyond support members 114, 130. Panel 206, panel 226, and sub-panels 236 and 238 cover 100% of support members 114, 130.

Support members 114, 130 are placed a) in the plane of the sleeping surface 20 or b) near or adjacent to the plane of the sleeping surface 20. Mesh panels 252, 262 are disposed wholly above the sleeping surface 20 when the guard frame 14 is in the upright and operating position.

FIG. 1A shows a portion of the bed rail 10 in phantom. This portion that is shown in phantom is the portion that is found between the mattress 16 and the box spring 18 when the guard frame 14 is in the upright and operating position. That which is immediately between the mattress 16 and box spring 18, is the portion of base support 24 that is distal to the seat 48, with the seat 48 acting as a counter member on one side of the mattress 16 while counter member 104 engages the other side of the mattress 16. That which is beyond the side of the mattress 16 is that which is forwardly of or proximal of distal side 82 of seat 48, as distal side 82 presses upon the side of the mattress 16. When the guard frame 14 is in the upright and operating position, the guard frame 14 is at the side of the bed 22. The bottom of the guard frame 14 including the support members 112, 128 lie at a greater distance from the side of the mattress 16 than the support members 114, 130 such that guard frame 14 is disposed obliquely relative to the side of the mattress 16. The oblique position is provided a) by the seat 62, shown in FIG. 3A, being further toward the absolute proximal end of base support 24 than U-shaped slots 86 in seat 48, and b) by the pin shaft 176 (engaging seat 62) and the nubs 202 (engaging U-shaped slots 86) being in a common plane with each other and with the guard frame 14 as a whole. When the guard frame 14 is at the side of the bed, an upper portion of guard frame 14 including straight portions 144, 156 may be disposed inwardly of a plane defined by the side of the mattress 16 confronted by the guard frame 14 and a lower portion of guard frame 14 including support members 112, 128 may be disposed outwardly of the same plane.

Figure 1B:
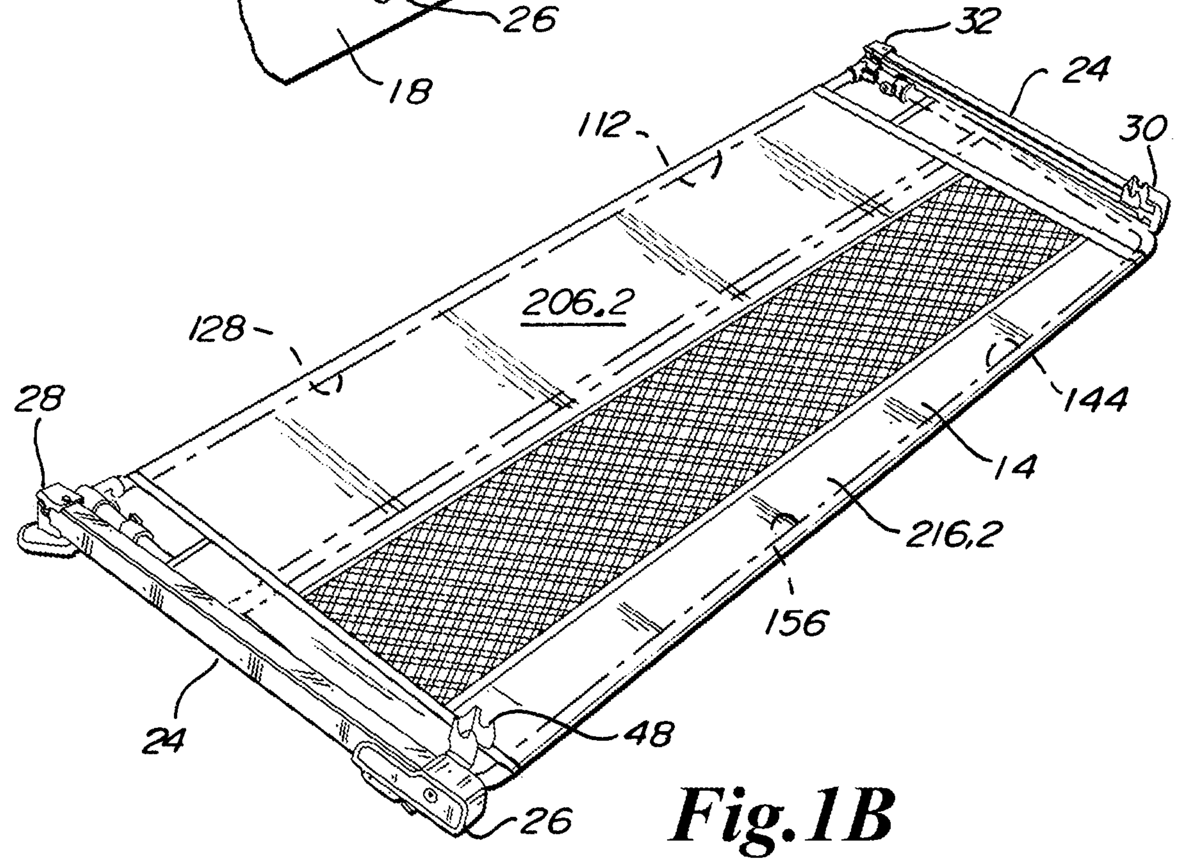
FIG. 1B is a perspective view of the bed rail of FIG. 1A showing the guard rail portion having been slid into the base frame.

FIG. 1B shows the guard frame 14 tucked away in the base frame 14. Base frame 12 is made up of a pair of base supports 24. To secure the bed rail 10 to bed 22, the base supports 24 may be secured to a mattress 16, using counter member 104 and employing seat 48 as the other counter member. It is noted that base supports 24 are first engaged to the guard frame 14 and then the base supports 24 (having the guard frame 14 therebetween) are secured to mattress 16. Strap 74 may first be drawn not so tightly so as to permit easy lateral adjustment of the base supports 24 relative to bed 22 to account for the exact width of the guard frame 14.

The base supports 24 are engaged to the guard frame 14 by the pin heads 178 and washer 180 being inserted into openings 96 of respective distal plastic pieces 32 such that the pin shafts 176 enter the stepped slots 98 and then slide into the slots 56 of the slotted tube 34. Then, when the pin shafts 176 are adjacent to the stepped slots 98, the guard frame 14 and base supports 24 are manipulated (such as by relative rotation) such that the straight portions 144, 156 (front/upper end of guard frame 14) are adjacent the inwardly protruding seats 46 and such that the guard frame 14 is in a generally common plane with base frame 12.

When taking out the guard frame 14 for the night, the front end or top end of the guard frame 14 (including the straight portions 144, 156) is the first section to be pulled out from between the mattress 16 and the box spring 18, and the support members 112, 128 are the last sections to be pulled out from between the mattress 16 and the box spring 18. When putting the guard frame 14 away for the day, the lower end (or rear end) of the guard frame is the first section to be slipped between the mattress 16 and the box spring 18 and the upper (or front end) of the guard frame is the last section to be slipped in between the mattress 16 and the box spring 18.

Figure 2A:
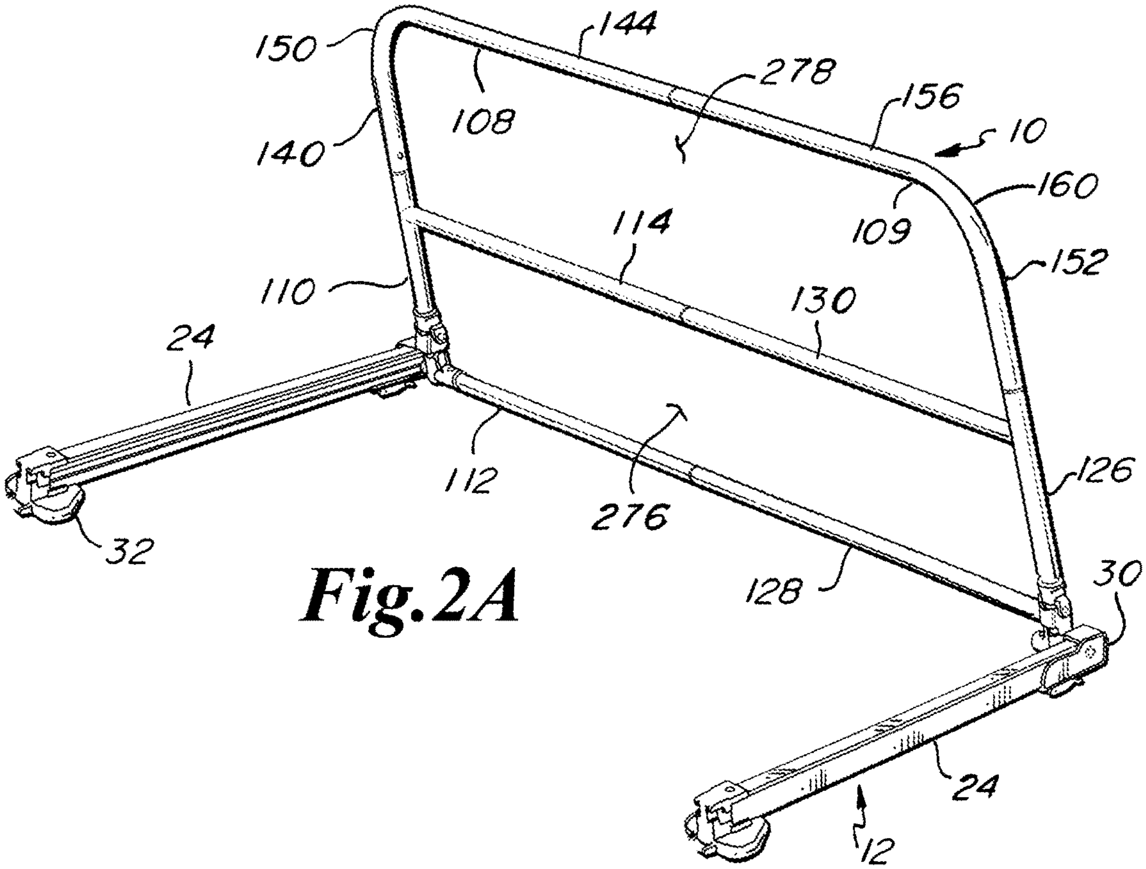
FIG. 2A is a perspective view of the bed rail of FIG. 1A with sheeting removed from the guard frame of the bed rail.

FIG. 2A shows the frame of the bed rail 10 outside of a bed 22 and without sheeting 204. FIG. 2A shows the bed rail 10 in the upright and operating position. Base supports 24 are set parallel to each other. A plane intersecting the lowermost point of seat 62 and the lowermost points of the U-shaped slots 86 of the seat 48 is an oblique plane relative to a plane intersecting the base supports 24 and thus the guard frame 14, lying generally in a plane, is set at an oblique position relative to the base supports 24.

FIG. 2B shows the sheeting 204 on the frame shown in FIG. 2A. The sheeting 204 is placed on the guard frame 14 prior to the guard frame 14 being engaged to the base supports 24 of the base frame 12. The sheeting 204 closes off openings in the frame. A lower or rear generally rectangular frame opening 276 is formed by support members 112, 128, 126 and 110 and this opening 276 is closed off by panel 206 having front or lower sub-panel 206.1 and rear or upper sub-panel 206.2. An upper or forwardly generally rectangular frame opening 278 is formed by support members 114, 130, 126, 110 and L-shaped pieces 109 and 108. Opening 278 is closed off by a part of sub-panel 206.1, a part of sub-panel 206.2, a part of sub-panel 238, a part of sub-panel 236, both the front and back sub-panels of panel 216, both the front and back sub-panels of panel 226, the mesh panel 252, and the mesh panel 262.

Figure 5A:
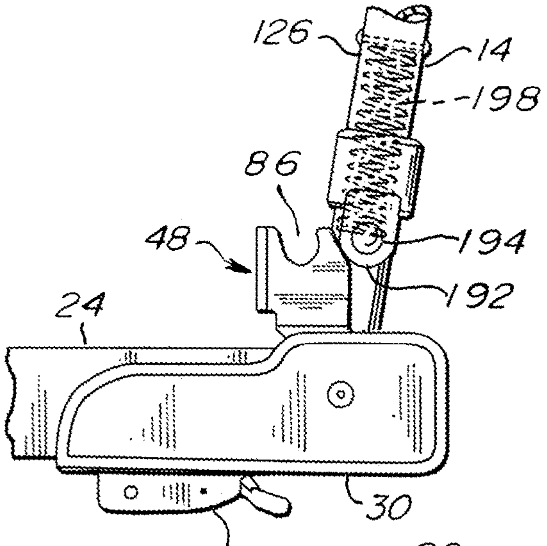
FIG. 5A is a detail side view of a section of the guard frame of the bed rail of FIG. 1A about to swing into engagement with a section of the base frame of the bed rail.

FIG. 5A shows, as the guard frame 14 is being swung up to the upright and operating position, nub 202 beginning to approach oblique edge 88. It is to be noted that nub 202 is hidden behind tab 192 and pin 194 and has not yet made contact with oblique edge 88. FIG. 5A shows support member 126 beginning to enter the three sided box formed by outer side 80, inner side 84 and distal side 82.

Figure 5B:
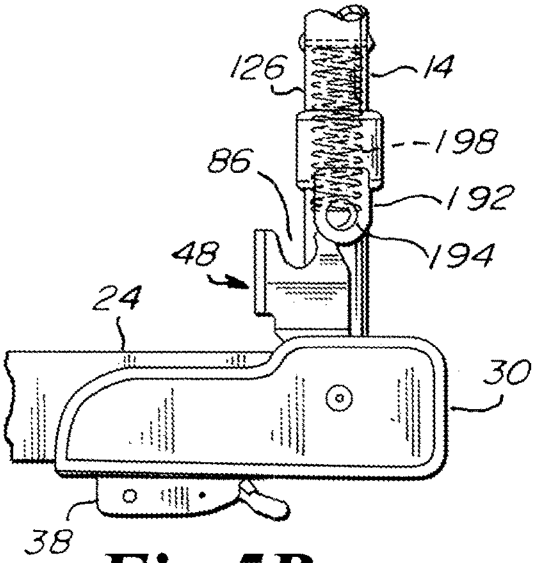
FIG. 5B is a detail side view of a section of the guard frame of the bed rail of FIG. 5A swinging further into engagement with a section of the base frame of the bed rail.

FIG. 5B shows a continued swinging of guard frame 14 and shows nub 202 at or near the apex of the oblique edge 88, about to pop down into U-shaped slot 86. It is to be noted that nub 202 is hidden behind tab 192 and pin 194. FIG. 5B shows the support member 126 having entered further into the three sided box formed by outer side 80, inner side 84 and distal side 82.

Figure 5D:
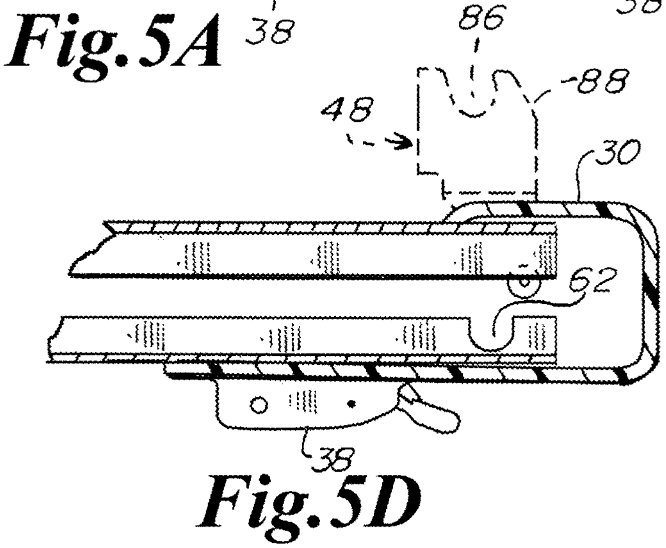
FIG. 5D is a detail side and partially phantom view of a section of the base frame of the bed rail of FIG. 1A.
Figure 5C:
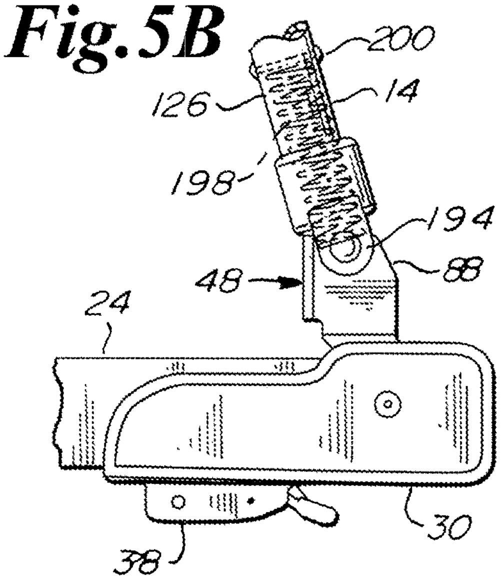
FIG. 5C is a detail side view of a section of the guard frame of the bed rail of FIG. 5B having swung into engagement with a section of the base frame of the bed rail and being disposed in the operating or guard position to prevent a person from falling out of bed.

FIG. 5C shows nub 202 having popped into slot 86. It is to be noted that nub 202 is hidden behind tab 192 and pin 194. FIG. 5C shows the guard frame 14 in the upright and operating position. FIG. 5C shows the support member 126 having fully entered the three sided box formed by outer side 80, inner side 84 and distal side 82. This three sided box a) minimizes outer lateral movement by support member 126 by outer side 80, b) minimizes inner lateral movement by support member 126 by inner side 84, and c) minimizes distal movement by support member 126 by distal side 82. The obliqueness of guard frame 14 in the upright and operating position is exaggerated for illustration.

FIG. 5D shows the oblique relation of seat 62 to U-shaped slot 86 to seat 62. Seat 62 seats pin shaft 176. Slot 86 seats nub 202.

Figure 5E:
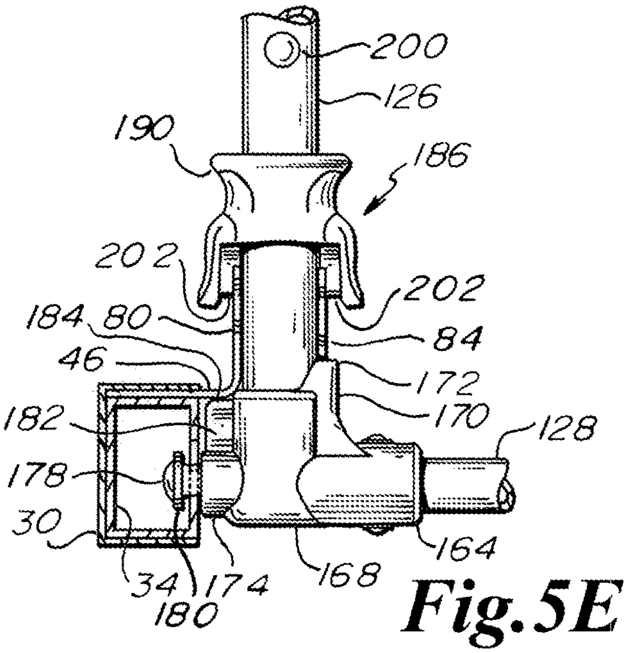
FIG. 5E is a detail front view of a section of the guard frame of FIG. 1A engaged with a section of the base frame of the bed rail.

FIG. 5E shows the shaft or pin shaft 176 engaged in seat 62, a lowermost elevation for pin shaft 176. FIG. 5E further shows uppermost end 184 of piece 182 of junction 162 adjacent to the underside of base 46 of seat 48. FIG. 5E further shows the top end of curved portion 172 of inverted U-shaped section 170 of junction 162 adjacent to the bottom edge of side 84 of seat 48 when the guard frame 14 is in the upright and operating position. By these structural relationships, guard frame 14 cannot swing upwardly and engage seat 48 unless pin shaft 176 is engaged in seat 62. If pin shaft 176 is at a higher elevation, such as still in slot 56, bottom portions of seat 48 will hit upper portions of junction 162. If pin shaft 176 is engaged in seat 62, uppermost end 184 and curved portion 172 of junction 162 guide the guard frame 14 along bottom portions of the seat 48. If pin shaft 176 is engaged in seat 62, nubs 202 slide cleanly against oblique edges 80 to automatically lock with seat 48.

Figure 6:
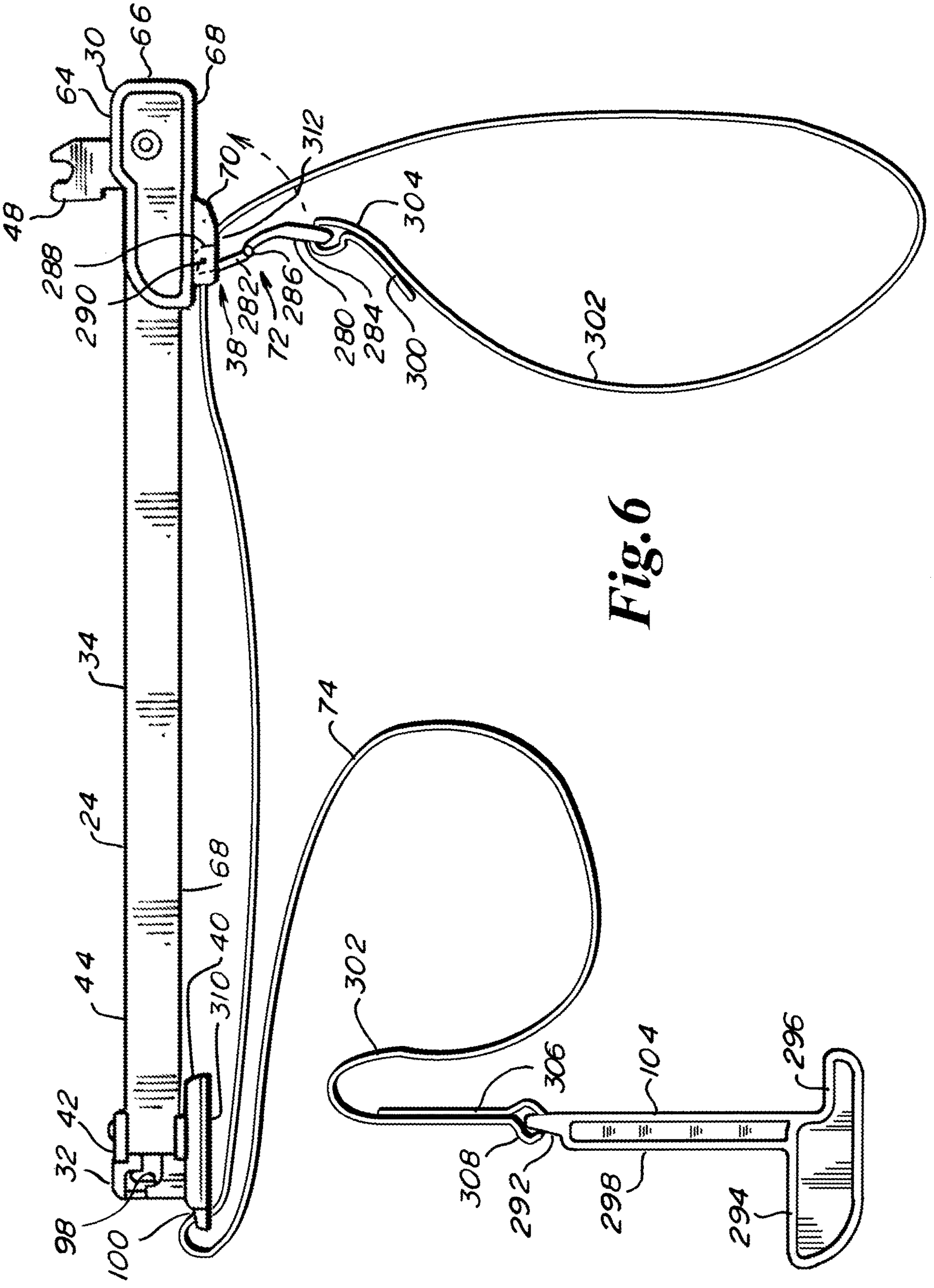
FIG. 6 is a detail side view of the base support of the bed rail of FIG. 1A and shows the counter member and strap that are not removable from the base support without destroying the integrity of the base support, counter member or strap.

FIG. 6 shows a detail side view of the base support 24, strap 74 and counter member 104. FIG. 6 further shows the proximal plastic piece 30 on one end of the base support 24 and the distal plastic piece 32 on the other end of the base support 24. FIG. 6 further shows the pincher mechanism 38 having a lever 72 engaged to sides 70. Lever 72 includes a finger manipulating end or proximal end 280 and a pinch end or distal end 282. Finger manipulating end 280 includes an opening 284 for strap 74. Pinch end 282 is L-shaped and runs from nub 286 to roughened surface 288 on a head of the pinch end 282. The L-shaped pinch end 282 is pivotally engaged between the sides 70 by lateral tabs extending from the head of the pinch end and engaging pivot openings 290 formed in the sides 70. If desired, a rivet or pin connector can be substituted for the lateral tabs, with such rivet or pin connector engaging pivot openings 290 and further engaging the head of the lever 72. Sides 70 extend longitudinally and downwardly from the bottom section 68 of the plastic proximal piece 30. One nub 286 extends laterally from one side of lever 72. Another nub 286 extends laterally from the other side of lever 72. The nubs 286 frictionally engaged the inner faces of sides 70 to hold the lever 72 in a confronting relationship with the underside 68 of proximal piece 30. In this confronting relationship, where finger manipulating end 280 is adjacent underside 68, the roughened surface 288 of the head of pinch end 282 pinches the strap 74 against a roughened surface of the underside 68 to lock the strap 74 and thus to lock the counter member 104 against the opposing side of the bed 22 and squeeze the mattress 16 between the counter member 104 and the seat 48. An open position of the buckle or pinch mechanism 38 is shown in FIG. 6, where the lever 72 is swung downwardly and away from a confronting relationship with underside 68. Strap 74 may be pulled either way through pinch mechanism 38 when mechanism 38 is in the open position.

FIG. 6 further shows a detail of the counter member 104. Counter member 104 includes a proximal end 292 having an opening for flexible strap 74. Counter member 104 further includes a first elongate surface 294 for abutting the far side of the mattress 16 and a second elongate surface 296 for abutting the far side of the box spring 18 of the bed 22. First surface 294 is proximal relative to second surface 296 when the counter member 104 is engaged. A body portion 298 of the counter member 104 extends between the mattress 16 and box spring 18. When body portion 298 is engaged between mattress 16 and box spring 18, body portion 298 lies horizontally and first and second surfaces 294, 296 extend vertically and are offset from each other axially along the axial direction of body portion 298.

FIG. 6 further shows that flexible strap 74 extends to and between counter member 104, distal plastic piece 32 and pinch mechanism 38 of proximal plastic piece 30. Strap 74 includes a proximal end 300 that has been inserted though opening 284 in lever 72 and then stitched back to a body 302 of strap 74 to form a loop 304. From loop 304, strap 74 extends through pincher mechanism 38, through strap opening 100 of distal plastic piece 32, and then continues to the counter member 104 where the strap 74 extends through an opening in proximal end 292 of counter member 104. A distal end 306 of the strap 74 is stitched back to body portion 302 of strap 74 to form a loop 308. Counter member 104 is of a greater size than strap opening 100 such that counter member 104 cannot be slipped through opening 100. Neither the strap 74 or the counter member 104 can be removed from base apparatus 24 without destroying the integrity of the bed rail 10, such as the integrity of the stitching forming the loops 304, 308, the integrity of the opening at proximal end 292 of counter member 104, the integrity of the opening 284 in the lever 72, the integrity of the pivot connection between the lever 72 and the sides 70, or the integrity of the strap opening 100 of the distal piece 32. The opening at proximal end 292 of counter member 104, strap opening 100 in distal piece 32, the opening formed between end 288 of lever 72 and the underside 68 of proximal piece 30, and opening 284 of lever 72 are closed openings such that the strap 74 cannot slip out through a slot or in some transverse manner.

FIG. 6 further shows that the underside 68 of slotted tube 34 is disposed at a relatively high elevation and that the underside 310 of distal piece 32 and underside 312 of sides 70 are disposed at a relatively low elevation when the base support 24 is disposed horizontally between the mattress 16 and box spring 18. Still further, distal plastic piece 32 includes a top portion 42 and proximal plastic piece 30 includes a top section 64 on the top side 44 of slotted tube 34 such that the uppermost surfaces of top portion 43 and top section 64 are disposed at a relatively high elevation and the uppermost portion of top side 44 of slotted tube 34 are disposed at a relatively low elevation. In other words, a first structural relationship that provides vertical space for guard frame 14 between mattress 16 and box spring 18 is the vertical spacing between 1) underside 310 of piece 32 and underside 312 of buckle sides 70 on the one hand and 2) the underside 68 of slotted tube 34 on the other hand. Undersides 310 and 312 are generally parallel to each other. A second structural relationship that provides vertical space for guard frame 14 between mattress 16 and box spring 18 is the vertical spacing between 1) the uppermost surfaces of top section 42 of distal piece 32 and top section 64 of proximal piece 30 on the one hand and 2) the top side 44 of slotted tube 34 on the other hand. In still other words, the bottom portion 40 of distal piece 32 acts as a leg, the top section 42 of distal piece 32 acts as a cap, the sides 70 of proximal piece 30 act as legs, and the top section 64 of proximal piece 30 acts as a cap. Such vertical spacing provided by the first and second structural relationships and by the proximal and distal pieces 30, 32 acting as caps and legs, provides more room for guard frame 14 as its slides along the length of base support 24 between the mattress 16 and box spring 18.

Prior to operating the bed rail 10, the guard frame 14 is first assembled. FIG. 3A shows the unassembled state. To assemble the guard frame 14, the following steps may be carried out: 1) pieces 106 and 107 are connected, 2) pieces 108, 109 are connected, and 3) the unit resulting from the first step is connected to the unit resulting from the second step. Or the following steps may be carried out: a) piece 109 is connected to piece 107, b) piece 108 is connected to piece 106, and c) the unit resulting from the step "a" is connected to the unit resulting from step "b." In the above steps, pieces 108 and 109 may be interchanged. After the pieces or units 106, 107, 108, and 109 have been engaged such that there are no free ends or connections and such that all pieces or units 106, 107, 108, 109 have been utilized, and as long as the integrity of the pieces 106, 107, 108, 109 are maintained, the only result is the guard frame 14 such that no other structure is possible from putting together the pieces 106, 107, 108, 109 and such that safety is maximized.

Then the base supports 24 are engaged to the assembled guard frame 14. This is accomplished by slipping the slot 96 of base support 24 over the pin head 178 and washer 180 and then, through stepped slots 98, slipping pin head 178 and washer 180 into the interior of the slotted tube 34 where the head 178 and washer 180 are free from entanglement in sheets. Then the base supports 24 are slid and pivoted relative to the guard frame 14 such that the front/upper end of the guard frame 14 is adjacent to the proximal ends 26 of the base supports 24 and such that the rear/lower end of the guard frame 14 is adjacent to the distal ends 28 of the base supports 24.

Then the assembled bed rail 10, having the guard frame 14 engaged to the base supports 24, is engaged to the bed 22. The two base supports 24 are engaged to the bed 22 by inserting each of the base supports 24 (having the guard frame 14 engaged therebetween) between the mattress 16 and box spring 18, placing the counter members 104 on the distal side of the bed 22 such that the counter member 104 abuts the distal side of the mattress 16 and the distal side of the box spring 18, placing distal sides 82 of the seats 48 of the guard frame 14 against the proximal side of the mattress 16, then drawing the strap 74 tightly to hug the mattress 16 tightly between the counter members 104 and seats 48, and then locking the strap 74 with the pincher or lock mechanism 38.

In operation of the bed rail 10, the front/upper end of the guard frame 14 is grasped and the guard frame 14 is pulled out in a sliding manner from between the mattress 16 and box spring 18. As the guard frame 14 is slid out, the pin shaft 176 rides in the slot 56 and on the lower edge 60 forming the slot 56. Then, as the pin shaft 176 approaches seat 62, a large portion of the guard frame 14 is free of the mattress 16 and box spring 18, and this permits the guard frame 14 to be pivoted upwardly. Then, as the guard frame 14 is being drawn out further from the bed 22, the pin shaft 176 drops into seat 62. If the pin shaft 176 overshoots the seat 62, the pin shaft 176 hits the distal end of stem 79, which acts as a stop to the pin shaft 176, which then drops into seat 62. Then the front/upper end of the guard frame 14 is swung upwardly and against the proximal side of the mattress 16. As the front/upper end is swung up, the nubs 202 begin to engage oblique edges 88, then slide up the oblique edges 88, then drop down in the U-shaped slots 86 of the seats 48, thereby locking the guard frame 14 against the proximal side of the mattress 16.

When the guard frame 14 is against the proximal side of the mattress 16, the pin shafts 178 are in the seats 62 and the nubs 202 are in the U-shaped slots 86. The normally downward bias by the expanding coil springs 198 keep the nubs 202 in the U-shaped slots 86. This locks the guard frame 14 against being pushed out away from the proximal side of the bed 22 by a person in the bed 22 rolling against the guard frame 14.

To swing the guard frame 14 away from the proximal side of the mattress 16 and to tuck the guard frame 14 back into the base frame 12, a user draws the collars 188 upwardly to compress springs 198 to draw the nubs 202 out of the U-shaped slots 86 and then pivots the guard frame 14 away from the proximal side of the mattress 16. Then the user permits the upper/front end of the guard frame 14 to pivot downwardly under the influence of gravity and, as the guard frame 14 begins to approach the plane of the underside of the mattress 16, the pin shafts 176 tend to pop out of the seats 62 so as to permit the user to begin to push the guard frame 14 back into the base frame 12. In its pushed in state, the upper/front end of the guard frame 14 is generally aligned between the proximal pieces 30 or inwardly of the proximal ends of the proximal pieces 30.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A bed rail having a guard frame barrier that can be tucked between a mattress and box spring of a bed and that can further be disposed at a side of the bed and upwardly beyond a sleeping surface of the bed to prevent a person from falling out of bed, comprising:

a) a base support and a guard frame where the guard frame has an operating position in a first plane adjacent to a proximal end of the base support and a stored position in a second plane adjacent to proximal and distal ends of the base support;

b) wherein the base support includes a slide portion that slidingly engages the guard frame, with the guard frame being slideable longitudinally along a length of the base support, with the slide portion being between the proximal and distal ends of the base support;

c) wherein the proximal end of the base support includes at least one leg and wherein the distal end of the base support includes at least one leg so as to relatively raise the slide portion of the base support and space the slide portion of the base support from the box spring and provide space for the guard frame between the box spring and mattress;

d) wherein the proximal end of the base support includes a bottommost surface and wherein the distal end of the base support includes a bottommost surface;

e) wherein said at least one leg of the proximal end of the base support includes a bottommost surface spaced from the bottommost surface of the proximal end of the base support; and f) wherein said at least one leg of the distal end of the base support includes a bottommost surface spaced from the bottommost surface of the distal end of the base support.

2. A bed rail having a guard frame barrier that can be tucked between a mattress and box spring of a bed and that can further be disposed at a side of the bed and upwardly beyond a sleeping surface of the bed to prevent a person from falling out of bed, comprising:

a) a base support and a guard frame where the guard frame has an operating position in a first plane adjacent to a proximal end of the base support and a stored position in a second plane adjacent to proximal and distal ends of the base support;

b) wherein the base support includes a slide portion that slidingly engages the guard frame, with the guard frame being slideable longitudinally along a length of the base support, with the slide portion being between the proximal and distal ends of the base support;

c) wherein the proximal end of the base support includes at least one cap and wherein the distal end of the base support includes at least one cap so as to relatively lower the slide portion of the base support and space the slide portion of the base support from the mattress and provide space for the guard frame between the box spring and mattress;

d) wherein the proximal end of the base support includes a topmost surface and wherein the distal end of the base support includes a topmost surface;

e) wherein said at least one cap of the proximal end of the base support includes a topmost surface spaced from the topmost surface of the proximal end of the base support; and f) wherein said at least one cap of the distal end of the base support includes a topmost surface spaced from the topmost surface of the distal end of the base support.

* * * * *